United States Patent
Hu et al.

(10) Patent No.: US 8,335,220 B2
(45) Date of Patent: Dec. 18, 2012

(54) METHOD AND NETWORK ELEMENT FOR OBTAINING IP-CAN SESSION POLICY CONTROL INFORMATION

(75) Inventors: Ying Hu, Shenzhen (CN); Shanshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 426 days.

(21) Appl. No.: 12/652,375

(22) Filed: Jan. 5, 2010

(65) Prior Publication Data

US 2010/0106845 A1 Apr. 29, 2010

Related U.S. Application Data

(63) Continuation of application No. PCT/CN2008/071498, filed on Jul. 1, 2008.

(30) Foreign Application Priority Data

Sep. 13, 2007 (CN) .......................... 2007 1 0145693

(51) Int. Cl.
*H04L 12/54* (2006.01)
*H04L 12/28* (2006.01)
*H04J 3/16* (2006.01)
*G06F 15/16* (2006.01)

(52) U.S. Cl. ..................... 370/400; 370/395.5; 370/465; 709/227

(58) Field of Classification Search .................. 370/338, 370/328–330, 410, 395.5, 400–402, 465, 370/469; 455/445–449; 709/227–228, 225

See application file for complete search history.

(56) References Cited

U.S. PATENT DOCUMENTS

| | | | | |
|---|---|---|---|---|
| 7,079,519 | B2 * | 7/2006 | Lee et al. ....................... | 370/338 |
| 7,746,819 | B2 * | 6/2010 | Skog et al. ..................... | 370/328 |
| 7,912,460 | B2 * | 3/2011 | Takeda ........................ | 455/422.1 |
| 7,940,697 | B2 * | 5/2011 | Savolainen et al. ........... | 370/254 |
| 8,116,728 | B2 * | 2/2012 | Cai et al. ...................... | 455/406 |
| 2002/0062379 | A1 | 5/2002 | Widegren et al. | |
| 2005/0283832 | A1 * | 12/2005 | Pragada et al. ................. | 726/12 |
| 2007/0036145 | A1 * | 2/2007 | Riley et al. .................... | 370/352 |
| 2007/0066286 | A1 * | 3/2007 | Hurtta ........................ | 455/414.1 |
| 2007/0209061 | A1 * | 9/2007 | Dekeyzer et al. ................ | 726/3 |
| 2007/0225001 | A1 * | 9/2007 | Heino et al. .................. | 455/446 |
| 2008/0046963 | A1 * | 2/2008 | Grayson et al. .................. | 726/1 |

(Continued)

FOREIGN PATENT DOCUMENTS

CN 1595887 A 3/2005

(Continued)

OTHER PUBLICATIONS

First Office Action issued in corresponding Chinese Patent Application No. 200810133380.0, mailed Jun. 12, 2010.

(Continued)

*Primary Examiner* — Thai Hoang
(74) *Attorney, Agent, or Firm* — Brinks Hofer Gilson & Lione (57) ABSTRACT

A method for obtaining IP-CAN session policy control information is applicable to a scenario where the access gateway does not process an IP-CAN session setup message directly, and includes: receiving a request for obtaining IP-CAN session policy control information; obtaining an address of an access gateway; and sending the IP-CAN session policy control information to the access gateway according to the address of the access gateway.

3 Claims, 7 Drawing Sheets

U.S. PATENT DOCUMENTS

| | | | |
|---|---|---|---|
| 2008/0117884 A1* | 5/2008 | Ishii et al. | 370/338 |
| 2009/0047967 A1* | 2/2009 | Zhu et al. | 455/445 |
| 2009/0177730 A1* | 7/2009 | Annamalai et al. | 709/202 |
| 2009/0225719 A1* | 9/2009 | Zhi et al. | 370/329 |
| 2009/0300207 A1* | 12/2009 | Giaretta et al. | 709/232 |
| 2010/0186064 A1* | 7/2010 | Huang et al. | 726/1 |
| 2010/0269155 A1* | 10/2010 | Droms et al. | 726/3 |

FOREIGN PATENT DOCUMENTS

| | | |
|---|---|---|
| CN | 1859335 A | 11/2006 |
| CN | 1859336 A | 11/2006 |
| CN | 101388836 B | 6/2011 |

OTHER PUBLICATIONS

3rd Generation Partnership Project: Technical Specification Group Services and System Aspects; Architecture Enhancements for non-3GPP accesses (Release 8). Global System for Mobile Communications. 3GPP TS 23.402 V1.1.0, Jun. 2007.

$3^{rd}$ Generation Partnership Project: Technical Specification Group Services and System Aspects; Policy and Charging Control Architecture (Release 7). Global System for Mobile Communications. 3GPP TS 23.203 V7.2.0, Mar. 2007.

Written Opinion of the Searching Authority of the International Searching Authority issued in corresponding PCT Application No. PCT/CN2008/071498; mailed Sep. 11, 2010.

Office Action issued in corresponding Chinese Patent Application No. 200810133380.0; issued Jun. 12, 2010.

Extended European Search Report issued in corresponding European Patent Application No. 08757892.8, mailed Sep. 14, 2010.

GSM, "$3^{rd}$ Generation Partnership Project; Technical Specification Group Services and System Aspects; Policy and Charging Control Architecture" (Release 7) 3GPP TS 23.203. V7.3.0, Jun. 2007.

\* cited by examiner

METHOD AND NETWORK ELEMENT FOR OBTAINING IP-CAN SESSION POLICY CONTROL INFORMATION

CROSS-REFERENCE TO RELATED APPLICATIONS

This application is a continuation of International Application No. PCT/CN2008/071498, filed on Jul. 1, 2008, which claims priority to Chinese Patent Application No. 200710145693.3, filed on Sep. 13, 2007, both of which are hereby incorporated by reference in their entireties.

FIELD OF THE INVENTION

The present invention relates to communication technologies, and in particular, to a method and network element for obtaining Internet Protocol Connectivity Access Network (IP-CAN) session policy control information.

BACKGROUND OF THE INVENTION

In the 3GPP System Architecture Evolution (SAE) network, the access network accesses the Packet Data Network (PDN) Gateway (GW) over an S2a/b/c interface to get access to the PDN, where the S2c interface is applicable to any access network such as a non-3GPP network and a 3GPP network. Mobility management is performed by using a DS-MIPv6 protocol, and the PDN GW serves as a Mobile IP (MIP) Home Agent (HA). The Policy and Charging Rules Function (PCRF) makes the decision of policy and charging rules for each service data. The PDN GW in the core network is a Policy and Charging Enforcement Function (PCEF), and is a network element that performs the policy and charging control rules of the data stream. The policy control includes Quality of Service (QoS) control.

The prior art provides a process for a UE to access the SAE network from a non-3GPP access network, and a process of obtaining IP-CAN session policy control information in a Policy and Charging Control (PCC) protocol.

In the process of developing the present invention, the inventor finds at least the following defects in the prior art:

The process of obtaining IP-CAN session policy control information is: The UE sends an MIP Binding Update request to the PDN GW to request setup of an IP-CAN session. The request sending triggers information exchange between the PDN GW and the PCRF to obtain the policy control information. The information exchange process does not involve the access gateway, and therefore the access gateway does not obtain the IP-CAN session policy control information. The PDN GW serves as a PCEF on the IP-CAN session path, and the access gateway serves as another PCEF on the IP-CAN session path. The access gateway is unable to perform policy and charging control on the service data between the UE and the PDN for lack of the IP-CAN session policy control information.

SUMMARY OF THE INVENTION

The embodiments of the present invention provide a method and network element for obtaining IP-CAN session policy control information so that the access gateway obtains the IP-CAN session policy control information.

The embodiments of the present invention provide the following technical solution:

A method for obtaining IP-CAN session policy control information includes:

receiving a request for obtaining IP-CAN session policy control information;
obtaining an address of an access gateway; and
sending the IP-CAN session policy control information to the access gateway according to the address of the access gateway.

A network element for obtaining policy control information includes:

a receiving unit, adapted to receive a request for obtaining IP-CAN session policy control information;
an address obtaining unit, adapted to obtain an address of an access gateway; and
a sending unit, adapted to send the IP-CAN session policy control information to the access gateway according to the address of the access gateway after receiving the request for obtaining the IP-CAN session policy control information.

In the embodiments of the present invention, the network element sends IP-CAN session policy control information to the access gateway according to the address of the access gateway after receiving the request for obtaining the IP-CAN session policy control information. Therefore, the access gateway obtains the IP-CAN session policy control information and can perform policy control on the service data subsequently transmitted between the UE and the PDN.

DETAILED DESCRIPTION OF THE EMBODIMENTS

The embodiments of the present invention provide a method for obtaining IP-CAN session policy control information. The method is applicable in a scenario where the access gateway does not process the IP-CAN session setup message directly. The method includes: receiving a request for obtaining IP-CAN session policy control information; obtaining an address of an access gateway; and sending the IP-CAN session policy control information to the access gateway according to the address of the access gateway. Through the technical solution of the present invention, the access gateway obtains the IP-CAN session policy control information and can perform policy control on the service data that is subsequently transmitted between the UE and the PDN.

Figure 1:
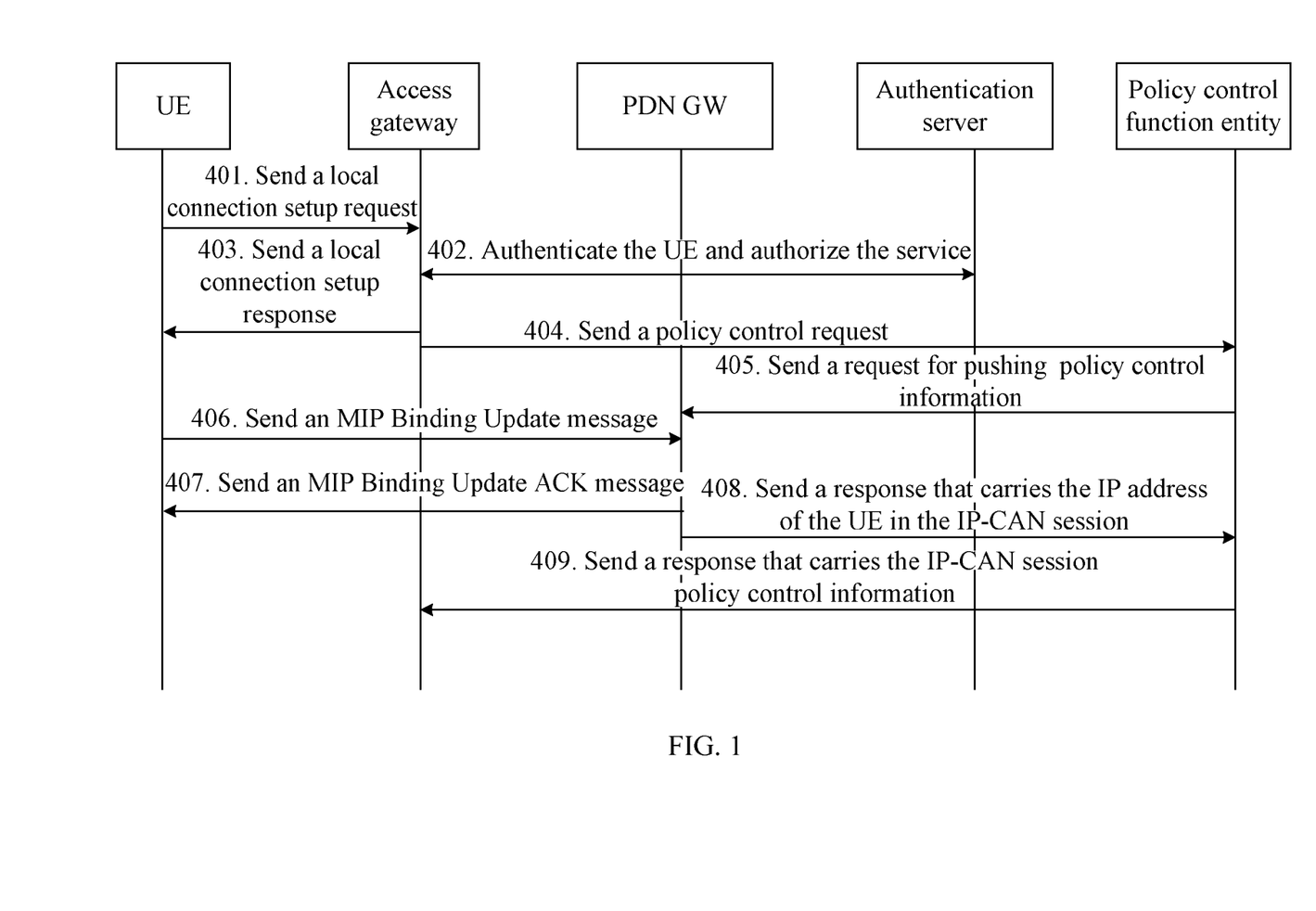
FIG. 1 is a flowchart of a method for obtaining IP-CAN session policy control information in a first embodiment of the present invention.

FIG. 1 is a flowchart of a method for obtaining IP-CAN session policy control information in the first embodiment of the present invention. The method includes the following steps:

Step 401: The UE sends a local connection setup request to the access gateway.

Step 402: The access gateway exchanges information with an authentication server to authenticate the user and authorize the service. The authentication server may be a Home Subscriber Server (HSS) and/or an Authentication, Authorization and Accounting (AAA) server.

Step 403: The access gateway authorizes the UE to access the PDN, and allocates a local IP address to the UE, and sends a local connection setup response including the local IP address and the service authorization information to the UE.

The service authorization information includes the information about the authorization for the UE to access the PDN.

Step 404: As a Policy Enforcement Point (PEP), the access gateway sends a policy control request to a policy control function entity. The policy control request includes a user identifier and a PDN identifier.

The policy control function entity is a PCRF or Policy Function (PF).

Step 405: The policy control function entity generates policy control information, and sends a request of pushing the policy control information to the PDN GW, requesting the PDN GW to execute the pushed policy control information. The request includes the user identifier and the PDN identifier.

After receiving the request of pushing the policy control information, the PDN GW determines the corresponding IP-CAN session according to the user identifier and the PDN identifier in the request. If no information about the IP-CAN session exists, the PDN GW records the user identifier and the PDN identifier as a new IP-CAN session index.

Step 406: The UE uses the local IP address as a Care of Address (CoA), and sends an MIP Binding Update message to the PDN GW, requesting setup of an IP connection to the PDN GW. The MIP Binding Update message includes a CoA address, a user identifier, and a PDN identifier.

The PDN GW serves as an MIP HA or a Local Mobility Anchor (LMA). After receiving the MIP Binding Update message, the PDN GW determines the corresponding IP-CAN session according to the user identifier and the PDN identifier in the message. If no information about the IP-CAN session exists, the PDN GW records the user identifier and the PDN identifier as a new IP-CAN session index.

The user identifier and the PDN identifier included in the request of pushing the policy control information in step 405 are the same as or equivalent to those included in the MIP Binding Update message in step 406. "Equivalent" means that the user indicated by the user identifier included in the request of pushing the policy control information is the same as the user indicated by the user identifier included in the MIP Binding Update message, and that the PDN indicated by the PDN identifier included in the request of pushing the policy control information is the same as the PDN indicated by the PDN identifier included in the MIP Binding Update message. The PDN GW determines that the IP connection requested by the MIP Binding Update message corresponds to the foregoing IP-CAN session according to the user identifier and the PDN identifier which serve as index information.

Step 405 may be performed before or after step 406, or step 5 and step 6 are performed simultaneously, which does not affect the implementation of the present invention.

If the IP address of the UE is still not allocated by the PDN GW in the IP-CAN session determined in step 405 and step 406, the PDN GW allocates the IP address of the UE of the IP-CAN session according to the user identifier and the PDN identifier. The request of pushing the policy control information in step 405 or the MIP Binding Update message in step 406 may serve as a condition that triggers the PDN GW to allocate the IP address of the UE of the IP-CAN session.

Step 407: The PDN GW sends an MIP Binding ACK message to the UE. The message includes the IP address of the UE of the IP-CAN session, and indicates that the IP connection between the UE and the PDN GW is already set up. The IP address of the UE of the IP-CAN session may serve as a Home Address (HoA).

Step 408: The PDN GW receives the delivered policy control information and sends a response to the policy control function entity. The response includes the IP address of the UE of the IP-CAN session.

Step 409: The policy control function entity generates IP-CAN session policy control information which includes the IP address of the UE of the IP-CAN session, and sends a response including the IP-CAN session policy control information to the access gateway.

Figure 2:
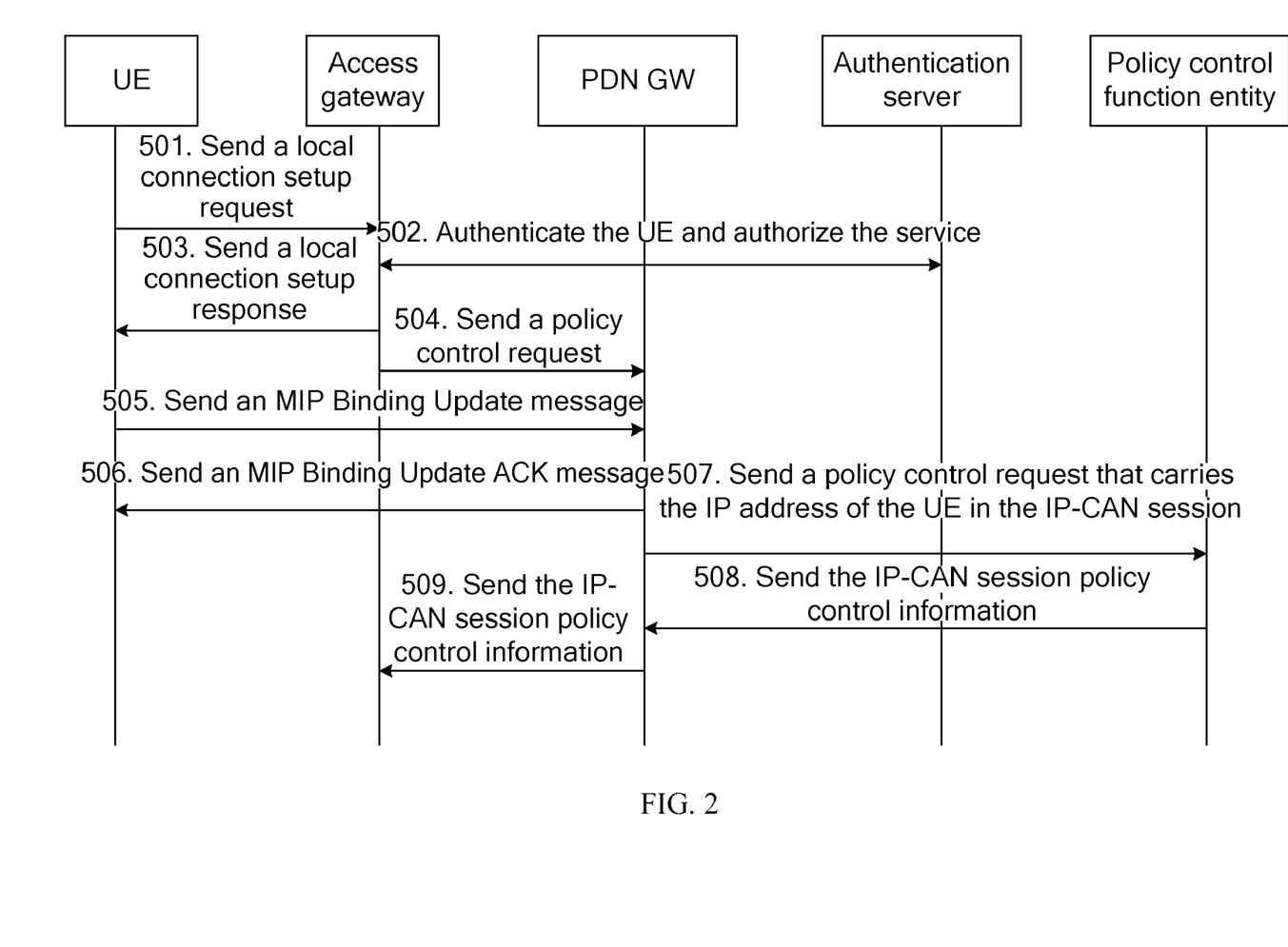
FIG. 2 is a flowchart of a method for obtaining IP-CAN session policy control information in a second embodiment of the present invention.

FIG. 2 is a flowchart of a method for obtaining IP-CAN session policy control information in the second embodiment of the present invention. The method includes the following steps:

Steps 501-503 are the same as steps 401-403.

Step 504: As a PEP, the access gateway sends a policy control request to the PDN GW. The request includes a user identifier and a PDN identifier. The PDN GW serves as another PEP in the IP-CAN session.

After receiving the policy control request, the PDN GW determines the corresponding IP-CAN session according to the user identifier and the PDN identifier in the request. If no information about the IP-CAN session exists, the PDN GW records the user identifier and the PDN identifier as a new IP-CAN session index.

Step 505: The UE uses the local IP address as a CoA, and sends an MIP Binding Update message to the PDN GW, requesting setup of an IP connection to the PDN GW. The MIP Binding Update message includes an HoA address, a user identifier, and a PDN identifier.

The PDN GW serves as an MIP HA or an LMA. After receiving the MIP Binding Update message, the PDN GW determines the corresponding IP-CAN session according to the user identifier and the PDN identifier in the message. If no information about the IP-CAN session exists, the PDN GW records the user identifier and the PDN identifier as a new IP-CAN session index.

The user identifier and the PDN identifier included in the policy control request in step 504 are the same as or equivalent to those included in the MIP Binding Update message in step 505. "Equivalent" means that the user indicated by the user identifier included in the policy control request is the same as the user indicated by the user identifier included in the MIP Binding Update message, and that the PDN indicated by the PDN identifier included in the policy control request is the same as the PDN indicated by the PDN identifier included in the MIP Binding Update message. The PDN GW determines that the IP connection requested by the MIP Binding Update message corresponds to the foregoing IP-CAN session according to the user identifier and the PDN identifier which serve as index information.

If the IP address of the UE is still not allocated by the PDN GW in the IP-CAN session determined in step 504 and step 505, the PDN GW allocates the IP address of the UE of the IP-CAN session according to the user identifier and the PDN identifier. The policy control request in step 504 or the MIP Binding Update message in step 505 may serve as a condition that triggers the PDN GW to allocate the IP address of the UE of the IP-CAN session.

Step 504 may be performed before or after step 505, or step 504 and step 505 are performed simultaneously, which does not affect the implementation of the present invention.

Step 506: The PDN GW sends an MIP Binding ACK message to the UE. The message includes the IP address of the UE of the IP-CAN session, and indicates that the IP connection is already set up between the UE and the PDN GW.

Step 507: The PDN GW sends a policy control request to the policy control function entity. The request includes the IP address of the UE of the IP-CAN session.

Step 508: The policy control function entity generates IP-CAN session policy control information which includes the IP address of the UE of the IP-CAN session, and sends the IP-CAN session policy control information to the PDN GW.

Step 509: The PDN GW sends a response including the IP-CAN session policy control information to the access gateway.

Figure 3:
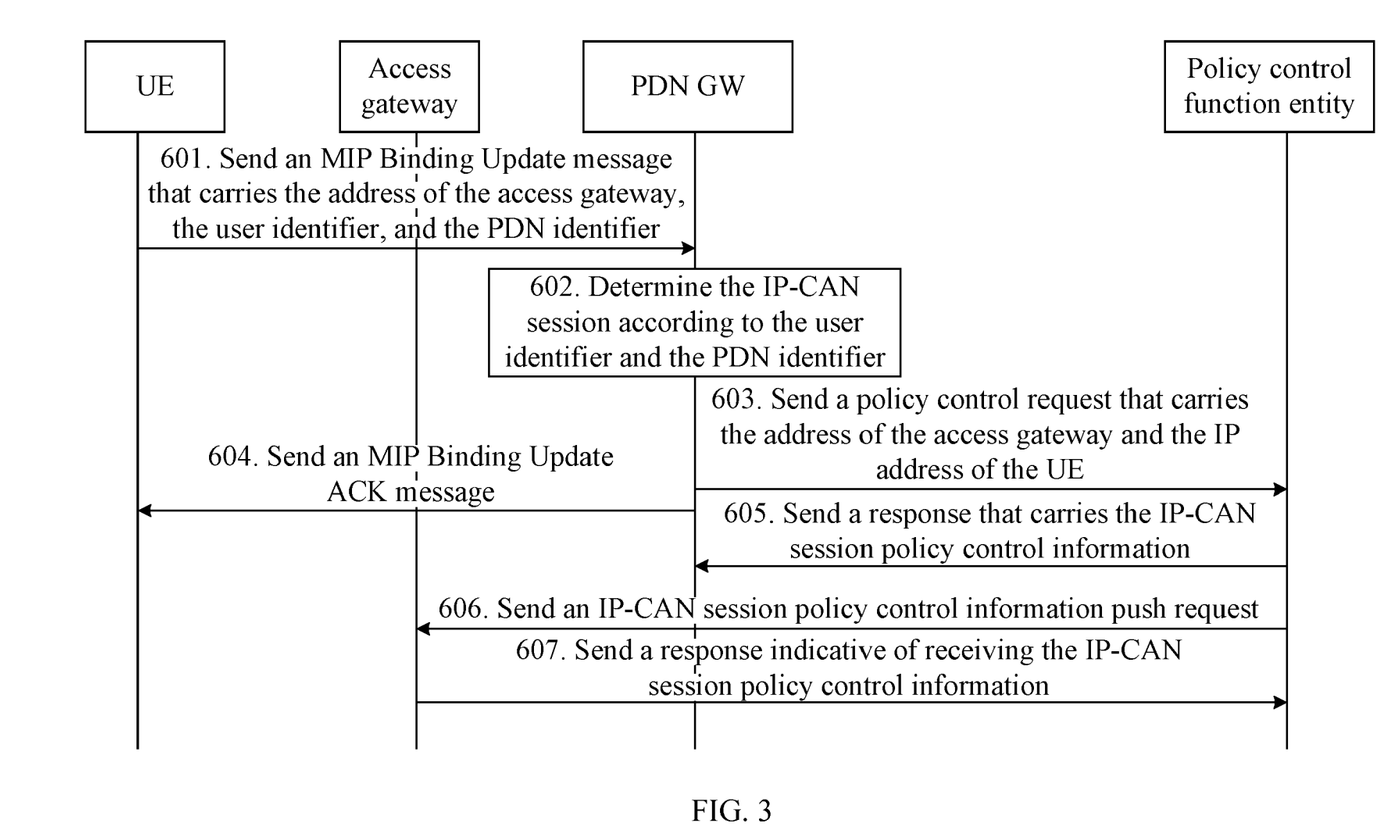
FIG. 3 is a flowchart of a method for obtaining IP-CAN session policy control information in a third embodiment of the present invention.

FIG. 3 is a flowchart of a method for obtaining IP-CAN session policy control information in the third embodiment of the present invention. In this method, the UE has set up a local connection with the access gateway. To access a data service, the UE needs to set up an IP connection with the PDN GW corresponding to the data service. The method includes the following steps:

Step 601: The UE uses the local IP address as a CoA, and sends an MIP Binding Update message to the PDN GW, requesting setup of an MIP connection to the PDN GW. The message includes an address of the access gateway, a user identifier, and a PDN identifier. The address of the access gateway is the addressing information of the access gateway, and may be such information as IP address and domain name information.

Step 602: After receiving the MIP Binding Update message, the PDN GW determines the IP-CAN session according to the user identifier and the PDN identifier. If necessary, the PDN GW allocates an IP address to the UE of the IP-CAN session. The IP address may be an HoA address.

Step 603: The PDN GW sends a policy control request to the policy control function entity. The request includes the IP address of the UE of the IP-CAN session and the address of the access gateway.

Step 604: The PDN GW sends an MIP Binding ACK message to the UE. The message includes the IP address of the UE of the IP-CAN session, and indicates that the IP connection is already set up between the UE and the PDN GW.

Step 605: The policy control function entity generates IP-CAN session policy control information which includes the IP address of the UE of the IP-CAN session, and sends a response including the IP-CAN session policy control information to the PDN GW.

Step 606: The policy control function entity sends a request of pushing the IP-CAN session policy control information to the access gateway according to the address of the access gateway.

Step 607: The access gateway sends a response indicative of receiving the IP-CAN session policy control information to the policy control function entity.

Figure 4:
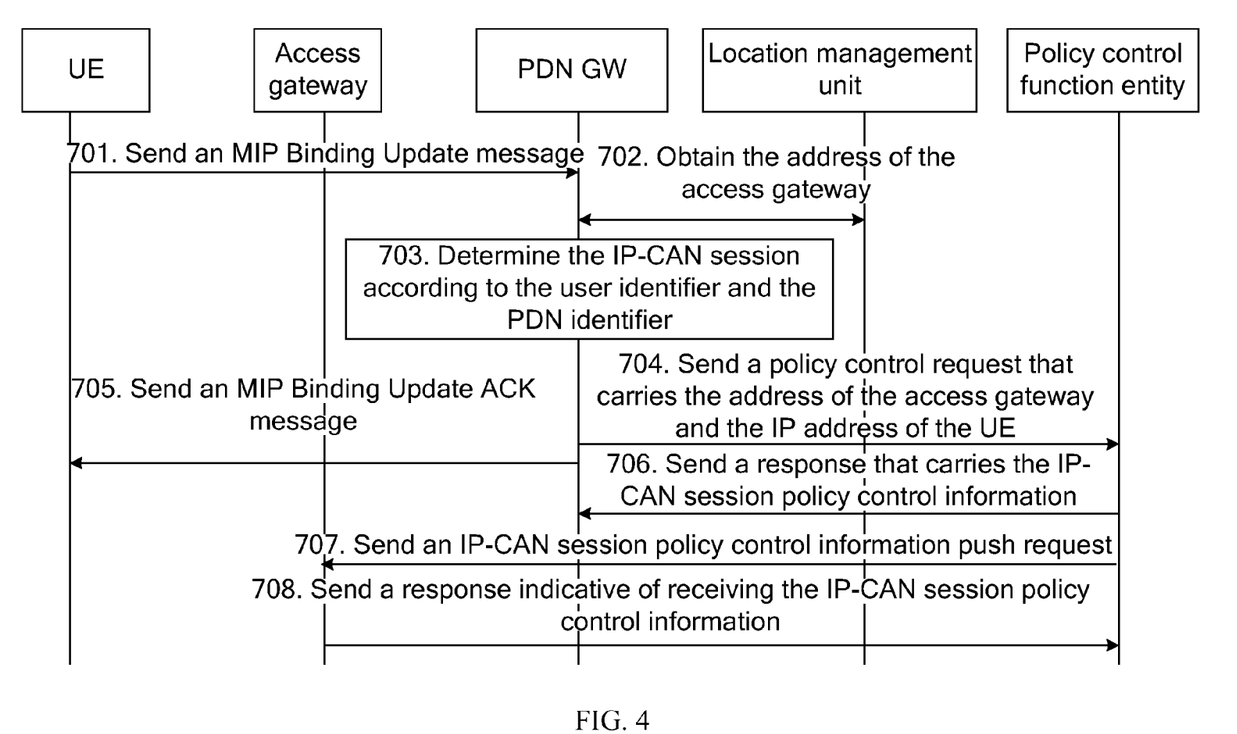
FIG. 4 is a flowchart of a method for obtaining IP-CAN session policy control information in a fourth embodiment of the present invention.

FIG. 4 is a flowchart of a method for obtaining IP-CAN session policy control information in the fourth embodiment of the present invention. In this method, the UE has set up a local connection with the access gateway. To access a data service, the UE needs to set up an IP connection with the PDN GW corresponding to the data service. After the UE accesses the PDN, the access gateway registers its own gateway information with a location management network element. The gateway information includes the mapping relationship between the access gateway address and the user identifier. The method includes the following steps:

Step 701: The UE uses the local IP address as a CoA, and sends an MIP Binding Update message to the PDN GW, requesting setup of an MIP connection to the PDN GW. The MIP Binding Update message includes a user identifier, and a PDN identifier.

Step 702: According to the user identifier, the PDN GW exchanges information with the location management network element to obtain the address of the access gateway connected with the UE. The address of the access gateway is the addressing information of the access gateway, and may be such information as IP address and domain name information.

Step 703: The PDN GW determines the IP-CAN session according to the user identifier and the PDN identifier. If necessary, the PDN GW allocates an IP address to the UE of the IP-CAN session. The IP address may be an HoA address.

Step 704: The PDN GW sends a policy control request to the policy control function entity. The request includes the address of the access gateway and the IP address of the UE of the IP-CAN session.

Step 705: The PDN GW sends an MIP Binding ACK message to the UE. The message includes the IP address of the UE of the IP-CAN session, and indicates that the IP connection is already set up between the UE and the PDN GW.

Step 706: The policy control function entity generates IP-CAN session policy control information which includes the IP address of the UE of the IP-CAN session, and sends a response including the IP-CAN session policy control information to the PDN GW.

Steps 707-708 are the same as steps 606-607.

Figure 5:
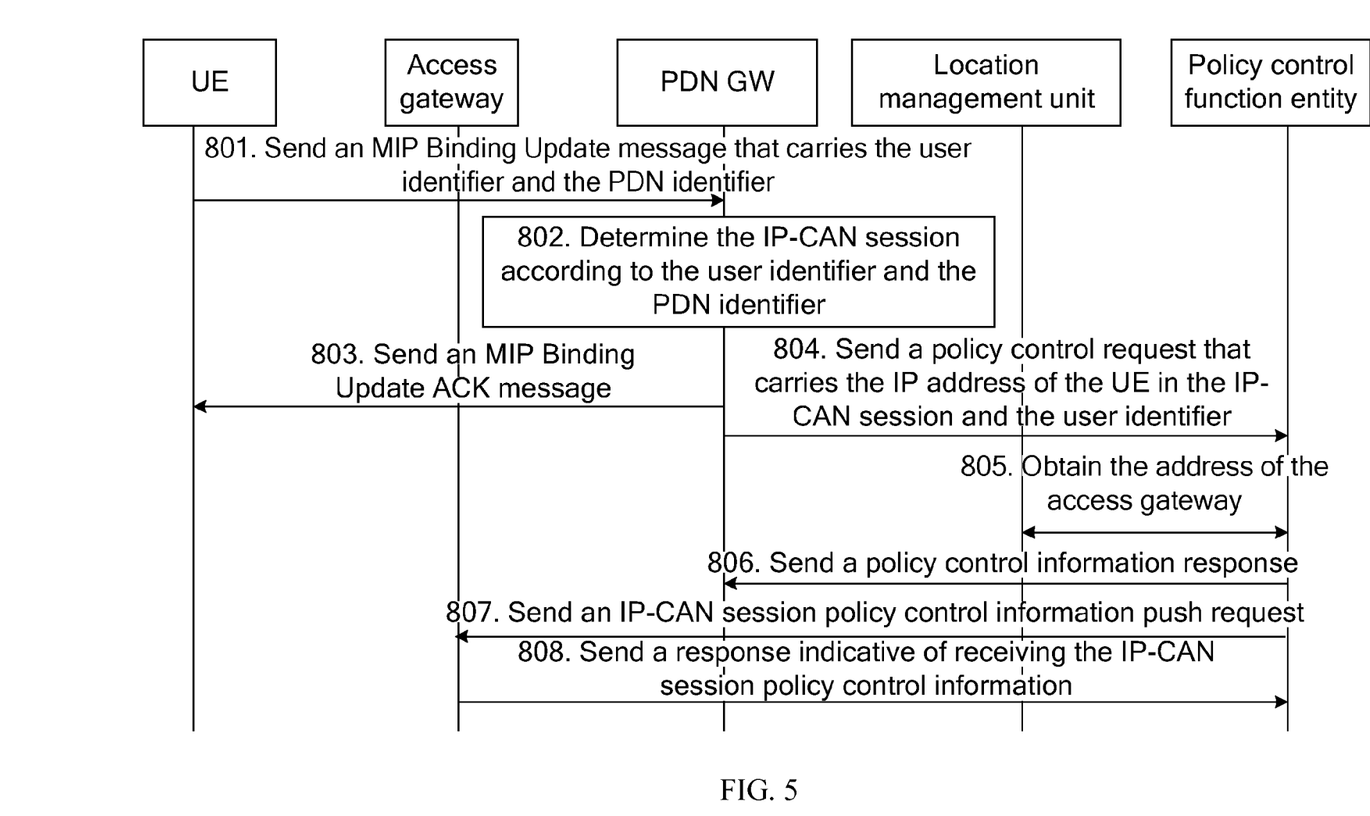
FIG. 5 is a flowchart of a method for obtaining IP-CAN session policy control information in a fifth embodiment of the present invention.

FIG. 5 is a flowchart of a method for obtaining IP-CAN session policy control information in the fifth embodiment of the present invention. In this method, the UE has set up a local connection with the access gateway. To access a PDN for data service, the UE needs to set up an IP connection with the PDN GW corresponding to the PDN. After the UE accesses the PDN, the access gateway registers its own gateway information with a location management network element. The gateway information includes the mapping relationship between the access gateway address and the user identifier. The method includes the following steps:

Step 801: The UE uses the local IP address as a CoA, and sends an MIP Binding Update message to the PDN GW, requesting setup of an MIP connection to the PDN GW. The message includes a user identifier, and a PDN identifier.

Step 802: The PDN GW determines the IP-CAN session according to the user identifier and the PDN identifier. If necessary, the PDN GW allocates an IP address to the UE of the IP-CAN session. The IP address may be an HoA address.

Step 803: The PDN GW sends an MIP Binding ACK message to the UE. The message includes the IP address of the UE of the IP-CAN session, and indicates that the IP connection is already set up between the UE and the PDN GW.

Step 804: The PDN GW sends a policy control request to the policy control function entity. The request includes the IP address of the UE of the IP-CAN session and the user identifier.

Step 805: The policy control function entity obtains the address of the access gateway from the location management network element according to the user identifier.

Step 806: The policy control function entity generates IP-CAN session policy control information which includes the IP address of the UE of the IP-CAN session, and sends a response including the IP-CAN session policy control information to the PDN GW.

Steps 807-808 are the same as steps 707-708.

Figure 6:
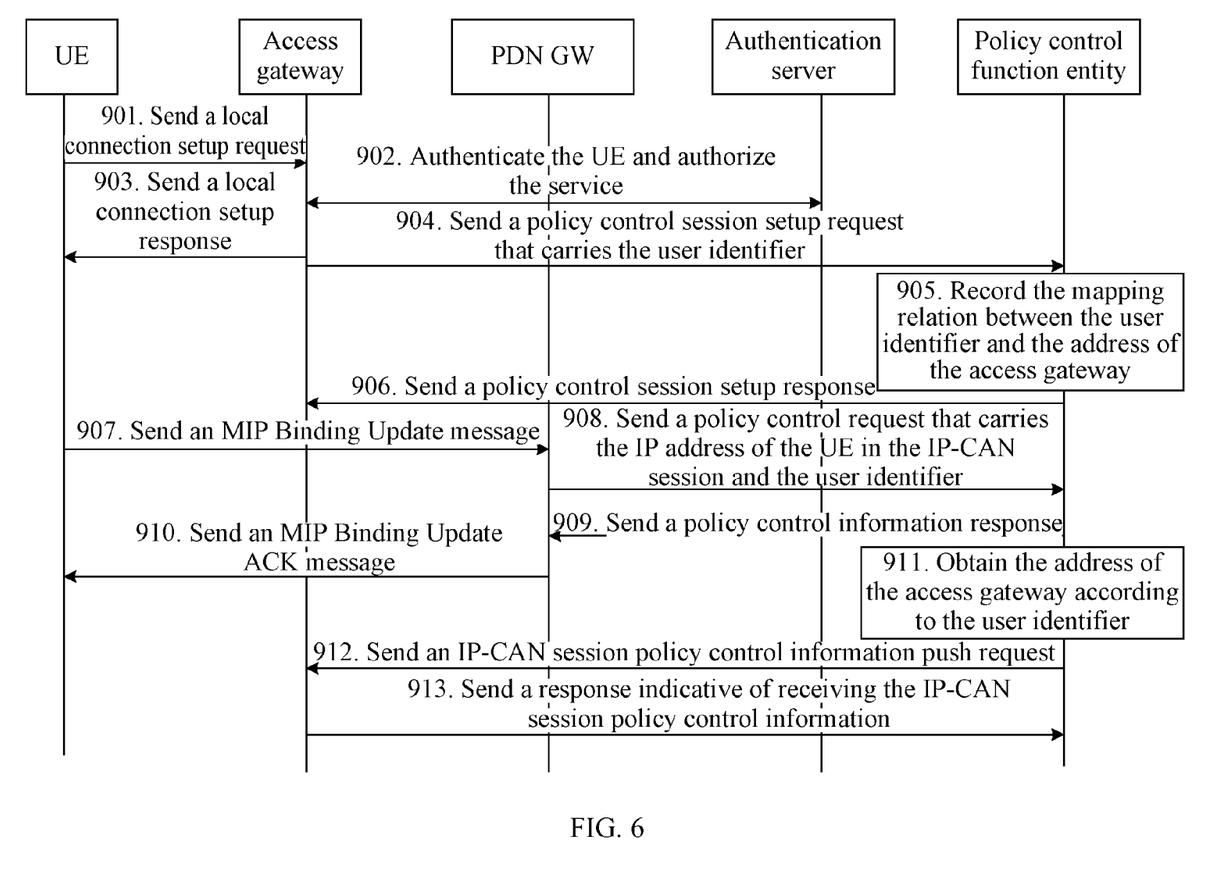
FIG. 6 is a flowchart of a method for obtaining IP-CAN session policy control information in a sixth embodiment of the present invention.

FIG. 6 is a flowchart of a method for obtaining IP-CAN session policy control information in the sixth embodiment of the present invention. The method includes the following steps:

Steps 901-903 are the same as steps 401-403.

Step 904: The access gateway sends a policy control session setup request to the policy control function entity according to the local connection set up with the UE. The policy control function entity is a PCRF or Policy Function (PF). The request includes a user identifier and an address of the access gateway. The address of the access gateway is the addressing information of the access gateway, and may be such information as IP address and domain name information.

Step 905: After receiving the policy control session setup request, the policy control function entity resolves the request to obtain and record the user identifier and the address of the access gateway.

Step 906: The policy control function entity sends a policy control session setup response to the access gateway, indicating success of setting up the policy control session.

Step 907: After completion of setting up the local connection, the UE uses the obtained local IP address as a CoA, and sends an MIP Binding Update message to the PDN GW, requesting setup of an MIP connection to the PDN GW. The message includes a user identifier, a PDN identifier, and a CoA address.

The PDN GW determines the IP-CAN session according to the user identifier and the PDN identifier. If necessary, the PDN GW allocates an IP address to the UE of the IP-CAN session. The IP address is used as an HoA address for MIP.

Step 908: The PDN GW sends a policy control request to the policy control function entity, requesting the IP-CAN session policy control information. The request includes the IP address of the UE of the IP-CAN session and the user identifier.

Step 909: The policy control function entity generates IP-CAN session policy control information including the IP address of the UE of the IP-CAN session, and sends a policy control information response including the IP-CAN session policy control information to the PDN GW.

Step 910: The PDN GW sends an MIP Binding ACK message to the UE. The message includes the IP address of the UE of the IP-CAN session to indicate that the IP connection is already set up between the UE and the PDN GW.

Step 911: The policy control function entity obtains the address of the access gateway according to the user identifier.

Step 912: The policy control function entity sends a request of pushing IP-CAN session policy control information to the access gateway.

Step 913: The access gateway sends a response indicative of receiving the IP-CAN session policy control information to the policy control function entity.

Figure 7:
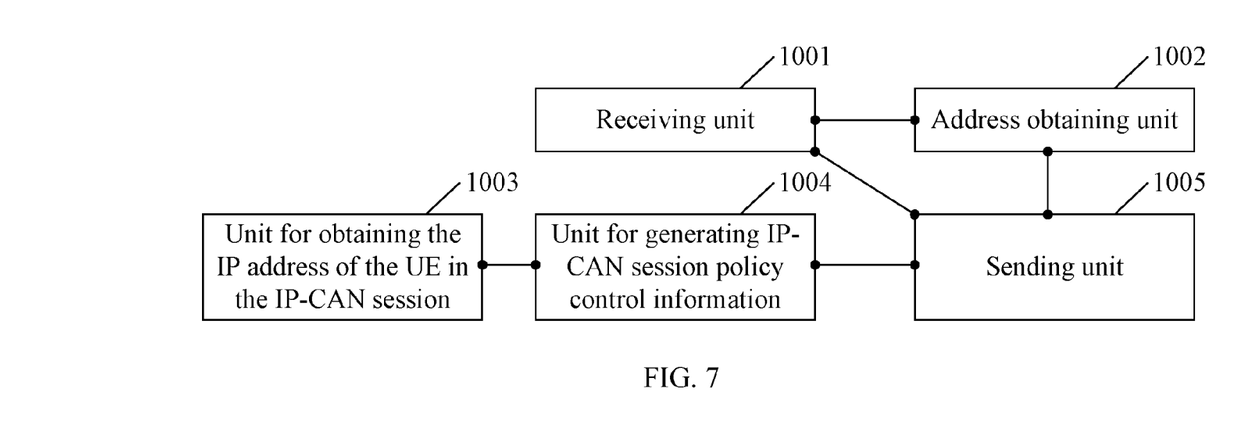
FIG. 7 shows a structure of a network element provided in a seventh embodiment of the present invention.

As shown in FIG. 7, a network element is provided in the seventh embodiment of the present invention. The network element is located on the PCRF, and includes: a receiving unit 1001, an address obtaining unit 1002, a unit 1003 for obtaining the IP address of the UE in an IP-CAN session, a unit 1004 for generating IP-CAN session policy control information, and a sending unit 1005.

The receiving unit 1001 is adapted to receive a request for obtaining IP-CAN session policy control information.

The address obtaining unit 1002 is adapted to obtain the address of the access gateway. The address of the access gateway is the addressing information of the access gateway, and may be such information as IP address and domain name information.

The unit 1003 for obtaining the IP address of the UE in an IP-CAN session is adapted to obtain the IP address of the UE of the IP-CAN session.

The unit 1004 for generating IP-CAN session policy control information is adapted to generate IP-CAN session policy control information which includes the IP address of the UE of the IP-CAN session.

The sending unit 1005 is adapted to send the IP-CAN session policy control information to the access gateway after receiving the request for obtaining the IP-CAN session policy control information.

When the request for obtaining the IP-CAN session policy control information is a policy control request including the address of the access gateway, the address obtaining unit 1002 is the first address obtaining unit, and is adapted to obtain the address of the access gateway from the policy control request; when the request for obtaining the IP-CAN session policy control information is a policy control request including a user identifier, the address obtaining unit 1002 is the second address obtaining unit, and is adapted to obtain the address of the access gateway from the location management network element according to the user identifier, or, the address obtaining unit 1002 is the third address obtaining unit, and is adapted to obtain the address of the access gateway according to the stored mapping relationship between the user identifier and the address of the access gateway.

Figure 8:
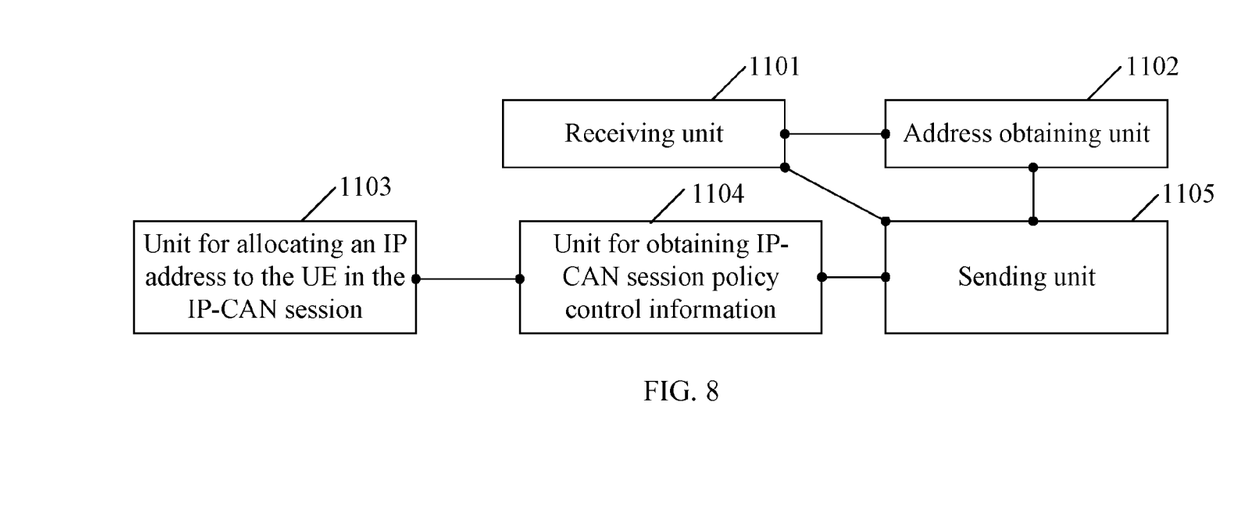
FIG. 8 shows a structure of a network element provided in an eighth embodiment of the present invention.

As shown in FIG. 8, a network element is provided in the eighth embodiment of the present invention. The network element is located on the PDN GW, and includes: a receiving unit 1101, an address obtaining unit 1102, a unit 1103 for allocating an IP address to the UE of the IP-CAN session, a unit 1104 for obtaining IP-CAN session policy control information, and a sending unit 1105.

The receiving unit 1101 is adapted to receive a request for obtaining IP-CAN session policy control information, where the request includes the address of the access gateway. The address of the access gateway is the addressing information of the access gateway, and may be such information as IP address and domain name information.

The address obtaining unit 1102 is adapted to obtain the address of the access gateway from the request for obtaining the IP-CAN session policy control information.

The unit 1103 for allocating an IP address to the UE of the IP-CAN session is adapted to allocate an IP address to the UE of the IP-CAN session, and send the IP address of the UE of the IP-CAN session to the policy control function entity.

The unit 1104 for obtaining IP-CAN session policy control information is adapted to obtain the IP-CAN session policy control information generated by the policy function entity after the policy function entity receiving the IP address of the UE.

The sending unit 1105 is adapted to send the IP-CAN session policy control information to the access gateway after receiving the request for obtaining the IP-CAN session policy control information.

It is understandable to those skilled in the art that all or part of the steps of the foregoing embodiments may be implemented by hardware instructed by a computer program. The program may be stored in a computer-readable storage medium. When being executed, the program performs all or part of the steps in foregoing method embodiments.

All functional units in the embodiments of the present invention may be integrated into a processing module, or exist independently, or two or more of such units are integrated into a module. The integrated module may be hardware or a software module. When being implemented as a software module and sold or applied as an independent product, the integrated module may also be stored in a computer-readable storage medium.

The storage medium may be a Read-Only Memory (ROM), a magnetic disk, or a Compact Disk (CD).

In the embodiments of the present invention, the network element sends IP-CAN session policy control information to the access gateway according to the address of the access gateway after receiving the request for obtaining the IP-CAN session policy control information, and therefore, the access gateway obtains the IP-CAN session policy control information and can perform policy control on the service data transmitted between the UE and the PDN according to the IP-CAN session policy control information in the subsequent IP-CAN session.

Detailed above are a method and network element for obtaining IP-CAN session policy control information. Although the invention is described through several exemplary embodiments, the invention is not limited to such embodiments. It is apparent that those skilled in the art can make modifications and variations to the invention without departing from the scope of the invention. The invention is intended to cover such modifications and variations provided that they fall in the scope of protection defined by the following claims or their equivalents.

What is claimed is:

1. A method for obtaining Internet Protocol Connectivity Access Network (IP-CAN) session policy control information, comprising:
   receiving, by a policy control function entity, a policy control session setup request from an access gateway, the policy control session setup request comprising a user identifier and an address of the access gateway;
   obtaining and recording, by the policy control function entity, the user identifier and the address of the access gateway;
   receiving, by the policy control function entity, a policy control request for obtaining the IP-CAN session policy control information from a Packet Data Network (PDN) Gateway (GW), the policy control request comprising the user identifier;
   obtaining, by the policy control function entity, the address of the access gateway according to the user identifier; and
   sending, by the policy control function entity, the IP-CAN session policy control information to the access gateway according to the address of the access gateway.

2. The method of claim 1, further comprising:
   receiving, by the PDN GW, a Mobile Internet Protocol (MIP) Binding Update message comprising the user identifier and the PDN identifier, to request an Internet Protocol (IP) connection from a User Equipment (UE) to the PDN;
   determining the requested IP connection corresponding to the IP-CAN session according to the user identifier and the PDN identifier; and
   sending, by the PDN GW, an MIP Binding ACK message comprising an IP address of the UE of the IP-CAN session to the UE.

3. A network element for obtaining policy control information, comprising:
   a receiving unit, adapted to receive a policy control request for obtaining Internet Protocol Connectivity Access Network (IP-CAN) session policy control information; wherein the policy control request comprises a user identifier;
   an address obtaining unit, adapted to obtain an address of an access gateway according to the user identifier; and
   a sending unit, adapted to send the IP-CAN session policy control information to the access gateway according to the address of the access gateway after receiving the request for obtaining the IP-CAN session policy control information;
   wherein the network device is further adapted to receive a policy control session setup request comprising the user identifier and the address of the access gateway from the access gateway, obtain and record the user identifier and the address of the access gateway.

* * * * *